United States Patent
Huang et al.

(10) Patent No.: US 7,522,352 B2
(45) Date of Patent: Apr. 21, 2009

(54) MOTOR STRUCTURE WITH BUILT-IN LENS

(75) Inventors: Ching-Hsing Huang, Taipei Hsien (TW); Chien-Long Hong, Taipei Hsien (TW); Jen-Hung Chung, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/740,851

(22) Filed: Apr. 26, 2007

(65) Prior Publication Data
US 2008/0192362 A1    Aug. 14, 2008

(30) Foreign Application Priority Data
Feb. 9, 2007    (CN) .......................... 2007 1 073260

(51) Int. Cl.
G02B 15/14    (2006.01)
G02B 7/02    (2006.01)
(52) U.S. Cl. ...................... 359/696; 359/694; 359/823

(58) Field of Classification Search ......... 359/694–701, 359/819–824
See application file for complete search history.

(56) References Cited

U.S. PATENT DOCUMENTS

| | | | |
|---|---|---|---|
| 5,751,502 A * | 5/1998 | Watanabe | 359/823 |
| 7,039,309 B2 | 5/2006 | Hsiao | |
| 7,161,751 B2 * | 1/2007 | Hasegawa et al. | 359/829 |
| 7,203,011 B2 * | 4/2007 | Ito et al. | 359/811 |

* cited by examiner

*Primary Examiner*—Mohammed Hasan
(74) *Attorney, Agent, or Firm*—Frank R. Niranjan

(57) ABSTRACT

A motor structure with built-in lens includes a lens mount (10) defining an inner space therein, a hollow stator (32) fixedly received in the inner space, a rotor (34) rotatably received in the stator with an internal thread (344) defined in an inner surface thereof, and a lens unit (50) received in the rotor. The lens unit defines an external thread (544) on an outer surface thereof threadedly engaging with the internal thread of the rotor. A protrusion (328) is formed on an inner surface of the stator for supporting an outer surface of the rotor thus obtaining stable rotation of the rotor.

18 Claims, 7 Drawing Sheets

MOTOR STRUCTURE WITH BUILT-IN LENS

BACKGROUND OF THE INVENTION

1. Field of the Invention

The present invention relates generally to cameras, and more particularly to a camera having a stepping motor with built-in lens.

2. Description of Related Art

The auto focus structure of a digital camera focuses on an object by comparing it with the image on an image sensor. The image sensor is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by a stepping motor. The stepping motor includes a cylinder-shaped stator with coil wound thereon, and a rotor received in the stator. The lens is received in the rotor. An internal thread is formed on an inner surface of the rotor, and an external thread screwed on the internal thread is formed on an outer surface of the lens. When a current is applied to the coil of the stator, the rotor is driven to rotate by the interaction of the alternating magnetic field established by the stator and the magnetic field of the rotor. The rotation of the rotor is then converted into the axial telescopic movement of the lens through the interaction between the internal thread of the rotor and the external thread of the lens. At the moment when the CPU detects its clearest image as the lens moves back and forth the motor is stopped. In this way, the lens stops at the best focal position (static position).

However, a narrow gap is usually formed between an outer surface of the lens and an inner surface of the motor for reducing friction between the rotor and the stator. As a result the lens may easily swing and rotate during telescopic movement, which, in most of cases, results in unstable and imprecise movement of the lens of the camera. Such a shortcoming needs to be solved.

SUMMARY OF THE INVENTION

According to a preferred embodiment of the present invention, a motor structure with built-in lens includes a lens mount defining an inner space therein, a hollow stator fixedly received in the inner space, a rotor rotatably received in the stator with an internal thread defined in an inner surface thereof, and a lens unit received in the rotor. The lens unit defines an external thread on an outer surface thereof threadedly engaging with the internal thread of the rotor. A protrusion is formed on an inner surface of the stator for supporting the outer surface of the rotor thus ensuring stable rotation of the rotor.

Other advantages and novel features of the present invention will be drawn from the following detailed description of a preferred embodiment of the present invention with attached drawings, in which:

BRIEF DESCRIPTION OF THE DRAWINGS

Many aspects of the present motor structure with built-in lens can be better understood with reference to the following drawings. The components in the drawings are not necessarily drawn to scale, the emphasis instead being placed upon clearly illustrating the principles of the present motor structure with built-in lens. Moreover, in the drawings, like reference numerals designate corresponding parts throughout the several views.

DETAILED DESCRIPTION OF THE INVENTION

Figure 1:
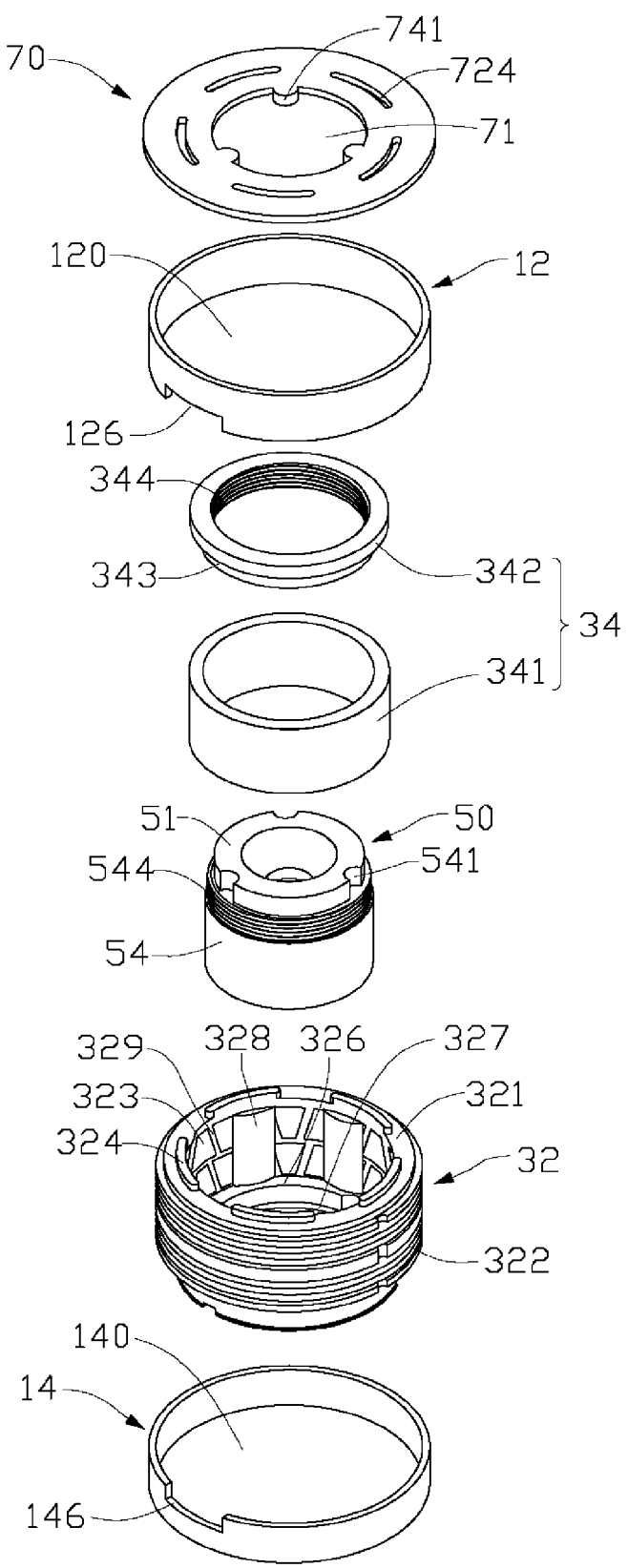
FIG. 1 is an isometric, exploded view of a motor structure with built-in lens in accordance with a preferred embodiment of the present invention.
Figure 2:
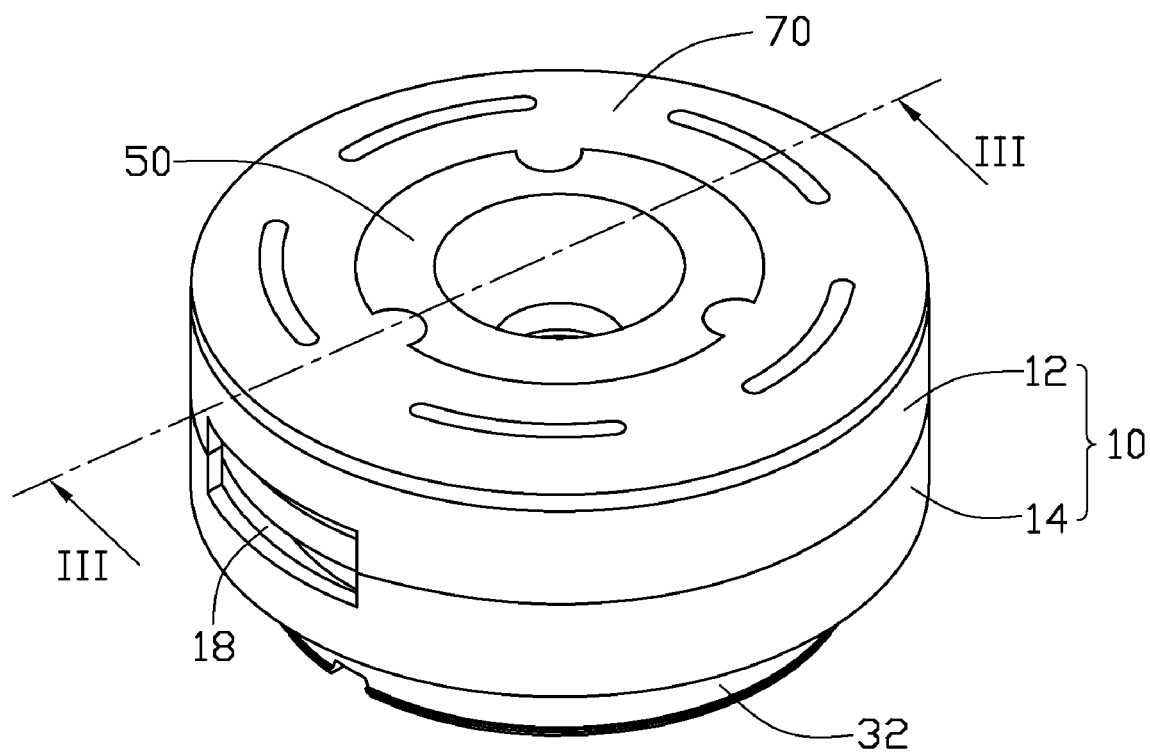
FIG. 2 is an assembled view of FIG. 1.
Figure 3:
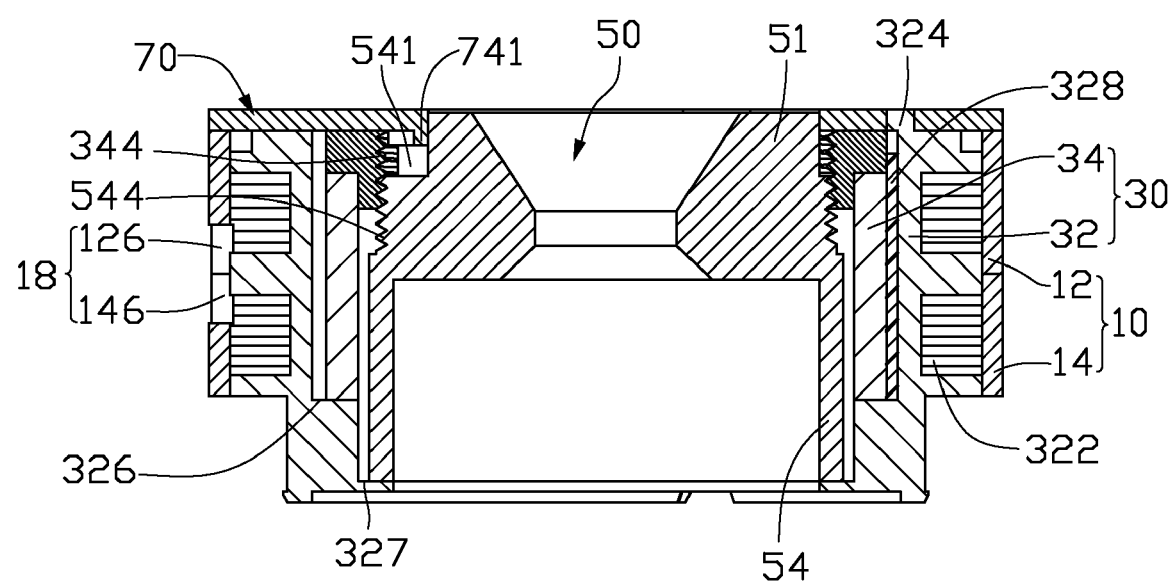
FIG. 3 shows a cross-sectional view of the motor structure with built-in lens taken along line III-III of FIG. 2.

Referring to FIGS. 1 through 3, a motor structure with built-in lens according to a preferred embodiment of the present invention includes a lens mount 10, a motor 30 received in the lens mount 10, a lens unit 50 being drivable by the motor 30, and a dust cover 70 arranged on a top end of the lens mount 10.

The lens mount 10 includes a lower barrel 14 and an upper barrel 12 located above and facing to the lower barrel 14. Each of the upper and lower barrels 12, 14 is cylindrical and defines a through hole 120, 140 in a center thereof. A cutout 126 is defined in a lower end of the upper barrel 12, while a cutout 146 is defined in an upper end of the lower barrel 14. When the two barrels 12, 14 are assembled together, the lower and upper ends of the two barrels 12, 14 abut each other, and thus cooperatively form the lens mount 10. The two cutouts 126, 146 of the two barrels 12, 14 cooperatively define a passage 18 in the lens mount 10 for extension of wires (not shown) therethrough to connect the motor 30 with a power source (not shown). The through holes 120, 140 of the two barrels 12, 14 cooperatively form a space receiving the motor 30 and the lens unit 50 therein.

The motor 30 is received in the space of the lens mount 10. The motor 30 is cylindrical and hollow. The outer diameter of the motor 30 is approximately the same as the inner diameter of the lens mount 10. The motor 30 includes a stator 32 and a rotor 34 rotatably received in the stator 32. The stator 32 includes a stator core 321 and a coil 322 wound around the stator core 321. The stator core 321 includes two claw-pole assemblies arranged back-to-back. Each of the claw-pole assemblies includes a plurality of upper and lower pole teeth 323 intermeshed with each other. Along a circumferential direction of the stator core 321, the upper and lower teeth 323 of each claw-pole assembly are arranged alternatively. The gaps between the upper and lower pole teeth 323 are filled with resin 329 inserted by insert molding, and thus fix the upper and lower pole teeth 323 together to form the stator core 321. Several protrusions 328 are formed on an inner surface of the stator core 321 and extend along an axial direction of the stator core 321. The protrusions 328 are integrally formed with the resin 329 during the process of insert molding. The protrusions 328 are evenly spaced from each other along the circumferential direction of the stator core 321. Each protrusion 328 has an arc-shaped inner surface. The coil 322 electrically connects with the wires. An annular flange 326 extends inwardly and radially from an inner surface of a bottom end of the stator core 321 for supporting the rotor 34 thereon. An annular bulge 327 extends inwardly and radially from an inner surface of a bottom of the flange 326 for supporting the lens unit 50 thereon. Five projections 324 extend upwardly from a top end of the stator core 321. The projections 324 are evenly arranged and spaced from each other along a circumferential direction of the stator core 321.

The rotor 34 includes a permanent magnet 341 and a hollow shell 342 mounted on a top end (not labeled) of the magnet 341. A bottom end (not labeled) of the magnet 341 opposite to the top end thereof abuts against the flange 326 of the stator 32 when the magnet 341 is received in the stator 32. The magnet 341 is cylindrical with an outer diameter a little smaller than the inner diameter of the stator 32, and an inner diameter larger than an outer diameter of the lens unit 50. The shell 342 has an outer diameter approximately the same as the outer diameter of the magnet 341, and an inner diameter smaller than the inner diameter of the magnet 341 and approximately the same as the outer diameter of the lens unit 50. The shell 342 defines an annular notch 343 in a bottom end thereof, and thus an outer surface of the shell 342 is step-shaped. The bottom end of the shell 342 has an outer diameter approximately the same as the inner diameter of the magnet 341, thus allowing the bottom end of the shell 342 to be fittingly inserted into the top end of the magnet 341. An internal thread 344 is formed on an inner surface of the shell 342.

The lens unit 50 is linearly movably received in the hollow shell 342 of the rotor 34. The lens unit 50 includes an upper portion 51 having a relatively smaller outer diameter, and a lower portion 54 having a relatively larger outer diameter. The outer diameter of the lower portion 54 of the lens unit 50 is approximately the same as the inner diameter of the shell 342. An external thread 544 is formed in an outer surface of an upper end of the lower portion 54 of the lens unit 50 to threadedly engage with the internal thread 344 of the rotor 34. Three grooves 541 are defined in an outer surface of the upper portion 51 of the lens unit 50. The grooves 541 are equidistantly spaced from each other, and extend through the upper portion 51 of the lens unit 50 along an axial direction thereof.

The dust cover 70 is ring-shaped, defining an opening 71 in a central portion thereof. An outer diameter of the cover 70 is the same as an outer diameter of the lens mount 10. An inner diameter of the cover 70 is smaller than the outer diameter of the lower portion 54 of the lens unit 50, and approximately the same as the outer diameter of the upper portion 51 of the lens unit 50. Three ears 741 extend inwardly from an inner circumferential of the cover 70, corresponding to the grooves 541 of the upper portion 51 of the lens unit 50. The ears 741 are equidistantly spaced from each other. Each ear 741 extends inwardly and then downwardly from the cover 70. A height of each ear 741 along an axial direction thereof is larger than that of the cover 70, but smaller than a length of the groove 541 of the lens unit 50. Five slots 724 are defined in the cover 70 corresponding to the projections 324 of the stator 32. The slots 724 are also equidistantly spaced from each other along a circumferential direction of the cover 70.

When assembled, the upper barrel 12 is mounted on the lower barrel 14 to define the space receiving the motor 30 therein. The lens unit 50 is movably received in the hollow motor 30. The rotor 34 of the motor 30 is arranged on the flange 326 with a narrow gap defined between the inner surface of the stator core 321 and an outer surface of the magnet 341, and the lens unit 50 is arranged on the bulge 327 with the external thread 544 screwing into the internal thread 344 of the shell 342 of the rotor 34. The protrusions 328 of the stator 30 are thus positioned in the gap between the rotor 34 and the stator 32 and abut the outer surface of the magnet 341. As the arc-shaped inner surface of the protrusion 328, linear contact is thus formed between the protrusion 328 and the rotor 34.

The dust cover 70 is mounted on the upper barrel 12. The projections 324 of the stator 32 are fitted in the slots 724 of the cover 70. An outer edge of a bottom face of the dust cover 70 is adhered to a top end of the upper barrel 12. Thus, the cover 70 is fixedly mounted on the motor structure with built-in lens and is prevented from rotation or movement along an axial direction thereof. Each ear 741 extends into a corresponding groove 541 of the upper portion 51 of the lens unit 50, thus avoiding rotation of the lens unit 50. The cover 70 has an inner diameter smaller than the outer diameter of the lower portion 54 of the lens unit 50; thus, the lower portion 54 of the lens unit 50 is constrained by the lens mount 10. In other words, the external thread 544 formed on the lower portion 54 of the lens unit 50 is held in the lens mount 10 by the dust cover 70.

Figure 4:
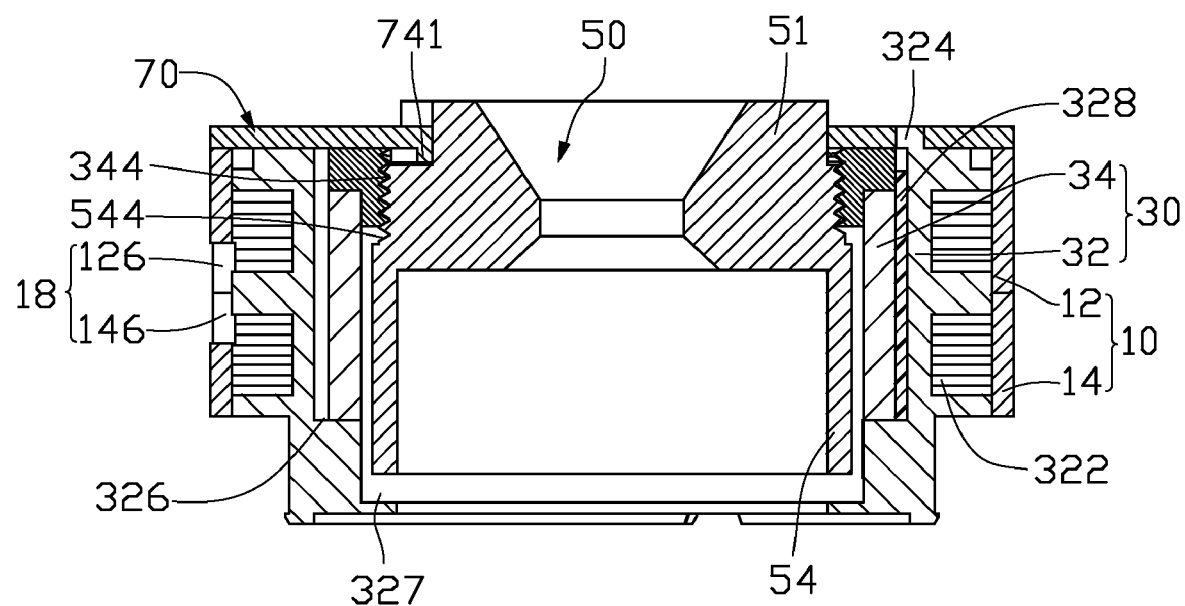
FIG. 4 is similar to FIG. 3, but showing that a lens unit of the motor structure with built-in lens is extended.

Referring to FIG. 4, during operation, a current is applied to the coil 322 of the motor 30 through the wires. The rotor 34 is driven to rotate by the interaction of the alternating magnetic field established by the stator 32 and the magnetic field of the rotor 34. The rotation of the rotor 34 then turns to the axial telescopic movement of the lens unit 50 through the interaction between the internal thread 344 of the rotor 34 and the external thread 544 of the lens unit 50. Therefore the motor 30 acts to drive the lens unit 50 into telescopic movement along the axial direction of the lens unit 50. As the motor 30 is directly positioned inside the cylindrical-shaped lens mount 10, a symmetrical ring shape structure is formed to improve the flexibility of the spatial disposition of the motor structure. Furthermore, as the protrusions 328 arranged between the stator 32 and the rotor 34, the rotor 34 does not contact the stator 32 directly, but contacts the protrusions 328. The arc-shaped protrusions 328 and the rotor 34 form linear contact. Thus the contacting area is much reduced, and friction between the rotor 34 and the protrusions 328 is much reduced. On the other hand, since the protrusions 328 fill the gap between the rotor 34 and the stator 32, the protrusions 328 support the rotor 34 radially and thus can avoid swinging of the rotor 34 during operation, resulting in stable and precise movement of the lens unit 50 of the camera.

Figure 5:
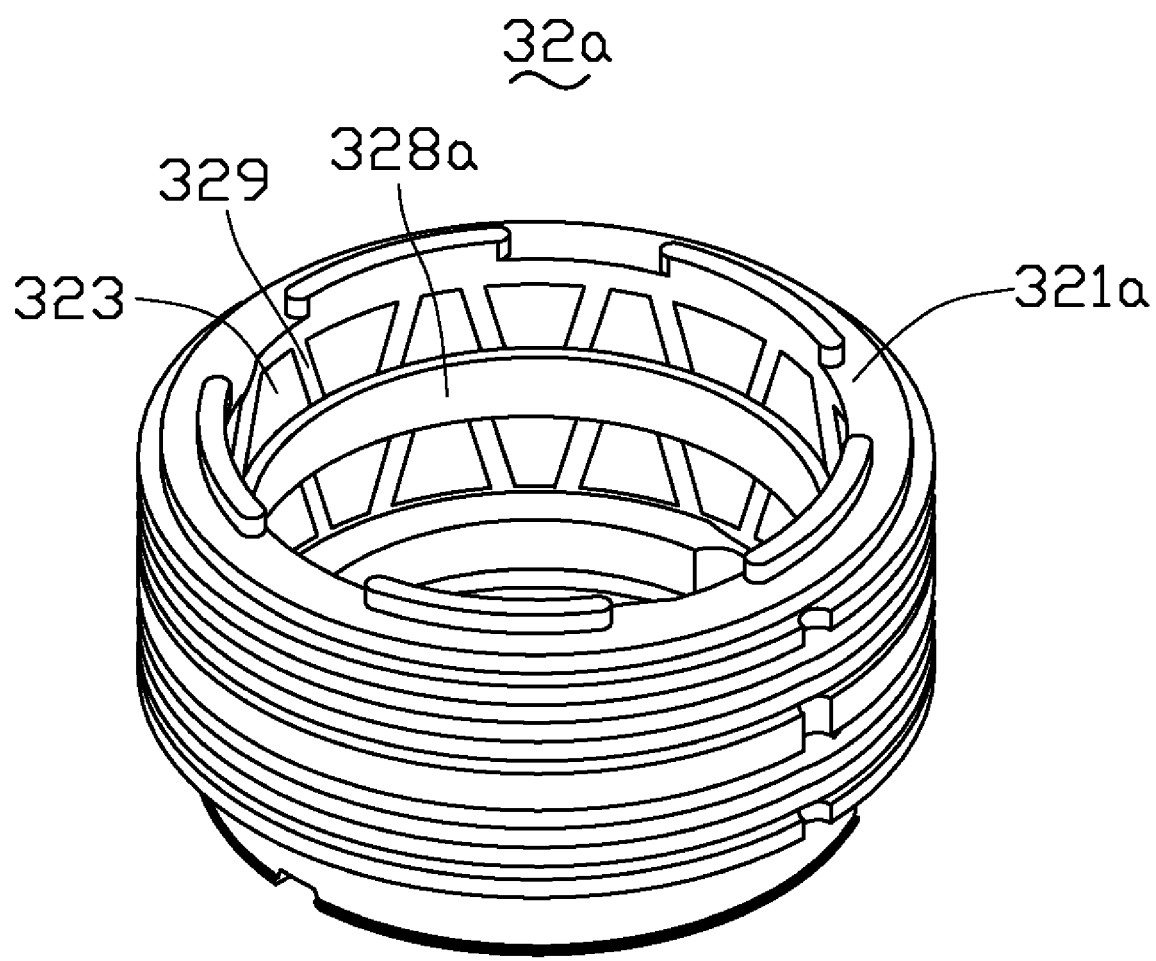
FIG. 5 is an isometric view of a stator of the motor structure with built-in lens in accordance with a second embodiment of the present invention.

Referring to FIG. 5, it illustrates the stator 32a of the motor in accordance with a second embodiment of the present invention. Other parts of the motor structure with built-in lens are the same as the first embodiment. The difference between the stator 32a of the second embodiment and that of the first embodiment is that the protrusion 328a is a ring formed on the inner surface of the stator core 321a with an inner diameter approximately the same as the outer diameter of the rotor 34. The protrusion 328a has a height much smaller than that of the rotor, and is arranged approximately on a middle of the stator core 321a. Thus the protrusion 328a and the rotor 34 form surface contact. As the protrusion 328a has a much smaller height, the contact area of the protrusion 328a and the rotor 34 is much reduced. Thus the protrusion 328a can support the rotation of the rotor 34 with lower friction and stable and precise movement.

Figure 6:
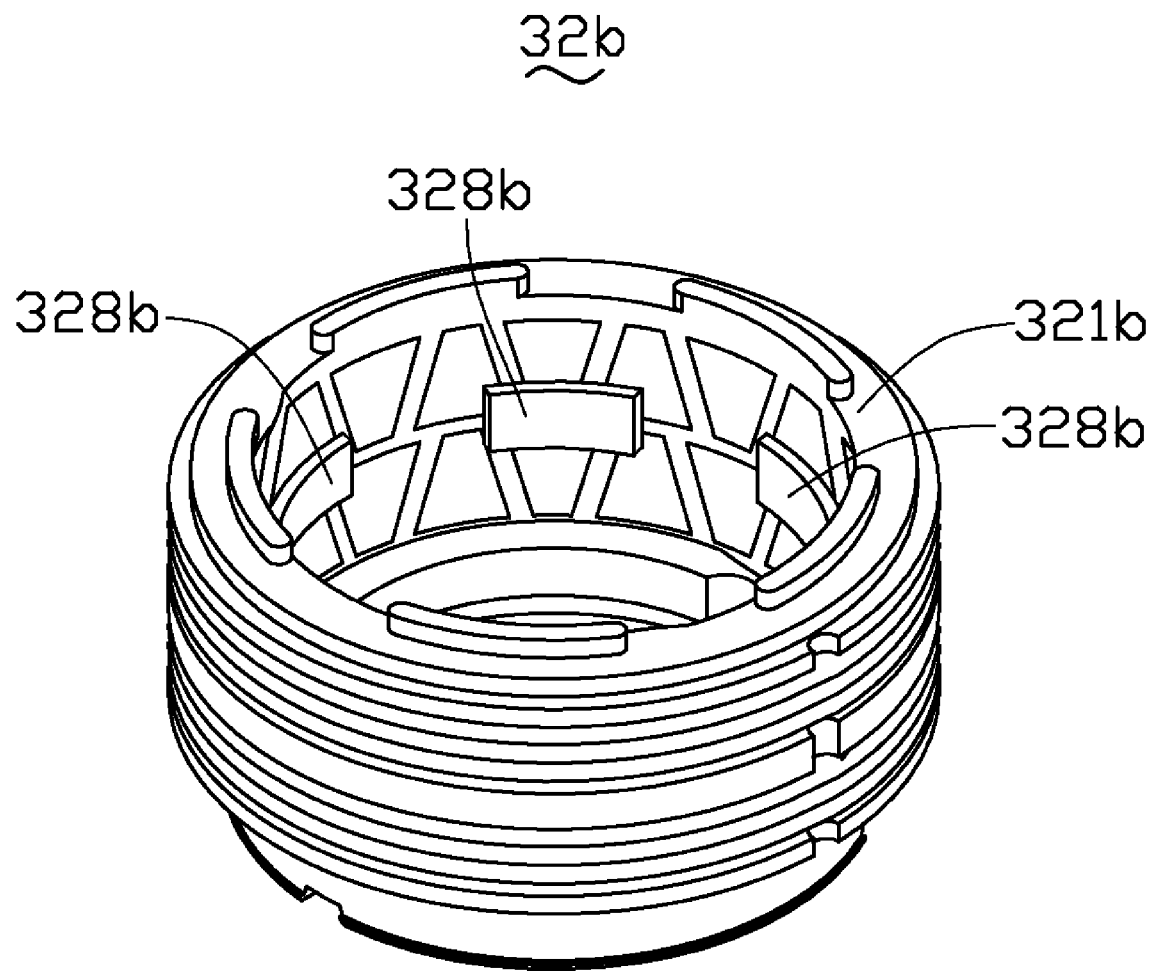
FIG. 6 is an isometric view of the stator in accordance with a third embodiment of the present invention.
Figure 7:
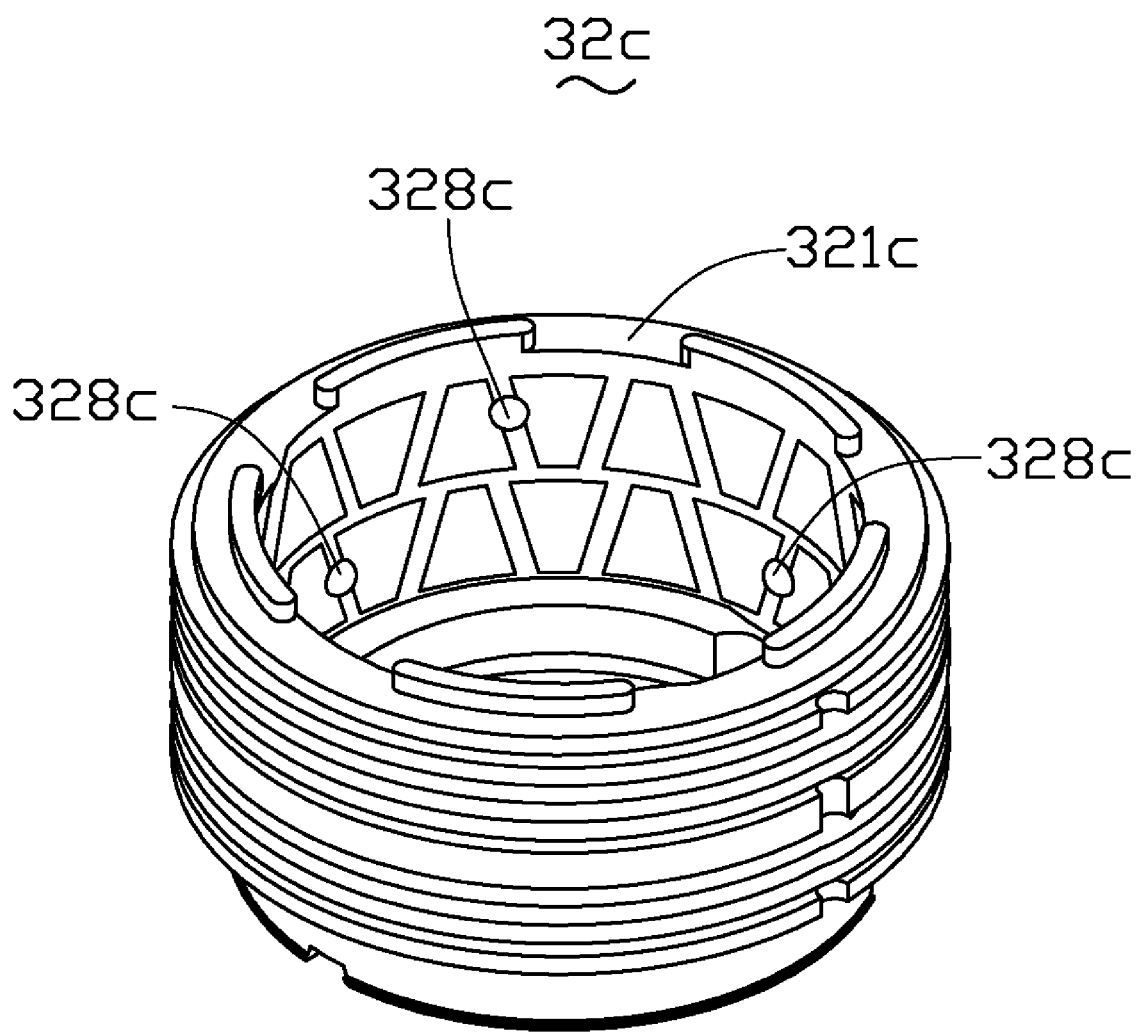
FIG. 7 is an isometric view of the stator in accordance with a fourth embodiment of the present invention.

FIG. 6 shows a third embodiment of stator 32b. The difference of the stator 32b of the third embodiment over the second embodiment is that the protrusions 328b are divided into several sections arranged on the inner surface of the stator 32b equidistantly spaced from each other. The sections cooperatively define a circumference supporting rotation of the rotor 34. FIG. 7 shows a fourth embodiment of the stator 32c. In this embodiment, the protrusions 328c includes a plurality of dots formed on the inner surface of the stator core 321c. Each protrusion 328c has an arc-shaped inner surface, and thus forms point contact with the rotor 34. The point contact reduces the contact area of the stator 32c and the rotor 34 so that the rotor 34 can have a stable and smooth rotation relative to the stator 32c.

While the invention has been described in connection with what is presently considered to be the most practical and preferred embodiment, it is to be understood that the invention is not limited to the disclosed embodiment, but, on the contrary, is intended to accommodate various modifications and equivalent arrangements.

What is claimed is:

1. A motor structure with built-in lens comprising:
a motor having a stator and a rotor being rotatably received in the stator, a gap being defined between an inner surface of the stator and an outer surface of the rotor;
a protrusion formed on the inner surface of the stator, the protrusion being arranged in the gap for supporting rotation of the rotor; and
a lens unit received in the lens mount and driven by the motor to telescopically move along an axial direction thereof;
wherein the rotor includes a cylinder-shaped magnet and a shell mounted on a top end of the magnet, the shell having a step-shaped outer surface and a bottom end engaging with the top end of the magnet, an internal thread being formed on an inner surface of the shell, the lens unit comprising an upper portion and a lower portion forming an external thread on an outer surface thereof to threadedly engage with the internal thread of the shell.

2. The motor structure of claim 1, wherein the stator comprises a stator core having a plurality of teeth intermeshed with each other, gaps between the teeth being filled with resin inserted by insert molding to fix the teeth together, the protrusion being integrally formed with the resin during the process of insert molding.

3. The motor structure of claim 1, wherein the protrusion is ring-shaped with a height smaller than that of the rotor.

4. The motor structure of claim 1, wherein the protrusion is divided into a plurality of sections, the sections being equidistantly spaced from each other along a circumferential direction of the stator.

5. The motor structure of claim 4, wherein each of the sections extends inwardly from the inner surface of the stator and forms an arc-shaped inner surface to form linear contact with the rotor.

6. The motor structure of claim 4, wherein each of the sections extends along one of an axial direction and the circumferential direction of the stator.

7. The motor structure of claim 1, wherein the protrusion comprises a plurality of dots, each of the dots having an arc-shaped inner surface and thus forming point contact between the protrusion and the rotor.

8. The motor structure of claim 1, further comprising a dust cover mounted on an upper end of the motor, the cover defining an opening for the upper portion of the lens unit to telescopically move therethrough, the lower portion of the lens unit being limited by the cover and prevented from being exposed to a surrounding environment of the motor structure with built-in lens during movement of the lens unit.

9. The motor structure of claim 8, wherein at least one groove is defined in an outer surface of the upper portion of the lens unit, and the cover forms at least one ear extending into the at least one groove of the lens unit.

10. A motor structure with built-in lens comprising:
a lens mount defining an inner space therein;
a hollow stator fixedly received in the inner space;
a rotor rotatably received in the stator, the rotor having an internal thread defined in an inner surface thereof;
a protrusion formed on an inner surface of the stator for supporting an outer surface of the rotor to obtain stable rotation of the rotor; and
a lens unit received in the rotor and having an external thread formed on an outer surface thereof and threadedly engaging with the internal thread of the rotor.

11. The motor structure of claim 10, wherein the stator comprises a stator core having a plurality of teeth intermeshed with each other, gaps between the teeth being filled with resin inserted by insert molding to fixedly combine the teeth together, the protrusion being integrally formed with the resin during the process of insert molding.

12. The motor structure of claim 10, wherein the protrusion is divided into a plurality of sections, the sections being equidistantly spaced from each other along a circumferential direction of the stator core, each of the sections extending along one of an axial direction and the circumferential direction of the stator core, and forming linear contact with the rotor.

13. The motor structure of claim 10, wherein the protrusion comprises a plurality of dots, each of the dots having an arc-shaped inner surface and thus forming point contact between the protrusion and the rotor.

14. The motor structure of claim 10, wherein the protrusion is ring-shaped with a height smaller than that of the rotor.

15. A motor structure with a built-in lens, comprising:
a stator;
a rotor for magnetically interacting with the stator to rotate in the stator; and
a lens unit having a lens at an end thereof, received in the rotor, wherein when the rotor rotates in the stator, the lens unit has a linearly telescopic movement relative to the rotor and the stator;
wherein the stator has a plurality of pole teeth interconnected together by resin, the resin forming at least a protrusion projecting inwardly from an inner face of the stator through a gap between the stator and the rotor to contact with the rotor.

16. The motor structure of claim 15, wherein the least a protrusion has a surface contact with the rotor.

17. The motor structure of claim 15, wherein the at least a protrusion has a linear contact with the rotor.

18. The motor structure of claim 15, wherein the at least a protrusion has a point contact with the rotor.

* * * * *